(12) United States Patent
Leon et al.

(10) Patent No.: US 6,914,106 B2
(45) Date of Patent: Jul. 5, 2005

(54) POLYMER MICROSPHERES CONTAINING LATENT COLORANTS AND METHOD OF PREPARATION

(75) Inventors: Jeffrey W. Leon, Rochester, NY (US); Tiecheng A. Qiao, Webster, NY (US); Robert E. Mccovick, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 193 days.

(21) Appl. No.: 10/625,684

(22) Filed: Jul. 23, 2003

(65) Prior Publication Data

US 2005/0027045 A1 Feb. 3, 2005

(51) Int. Cl.$^7$ ............................................. C09D 157/00
(52) U.S. Cl. ...................... 526/72; 526/201; 526/204; 524/458; 524/17; 524/56
(58) Field of Search .................... 526/72, 201, 504; 524/458, 17, 56

(56) References Cited

U.S. PATENT DOCUMENTS

| | | | |
|---|---|---|---|
| 3,767,412 A | | 10/1973 | Monbaliu et al. |
| 4,080,211 A | | 3/1978 | Van Paesschen et al. |
| 4,444,870 A | | 4/1984 | Hirano et al. |
| 4,837,168 A | | 6/1989 | de Jaeger et al. |
| 4,912,032 A | * | 3/1990 | Hoffman et al. ............. 435/7.1 |
| 5,412,087 A | | 5/1995 | McGall et al. |
| 5,489,678 A | | 2/1996 | Fodor et al. |
| 5,981,180 A | | 11/1999 | Chandler et al. |
| 6,023,540 A | | 2/2000 | Walt et al. |
| 6,079,283 A | | 6/2000 | Papen et al. |
| 6,083,762 A | | 7/2000 | Papen et al. |
| 6,094,966 A | | 8/2000 | Papen et al. |
| 6,203,973 B1 | | 3/2001 | Chen et al. |
| 6,266,459 B1 | | 7/2001 | Walt et al. |

FOREIGN PATENT DOCUMENTS

| | | | | |
|---|---|---|---|---|
| JP | 04255848 A | * | 9/1992 | ........... G03F/7/004 |
| JP | 05318909 A | * | 12/1993 | ............ B41M/5/28 |
| JP | 2000 178309 | | 6/2000 | |

OTHER PUBLICATIONS

Nature Biotechnology, vol. 19, pp. 631–635 (2001).
Macromolecular Rapid Communications, vol. 15, pp. 909–915 (1994).
Science, vol. 251, pp. 767–773, (1991).

\* cited by examiner

Primary Examiner—Kelechi C. Egwim
(74) Attorney, Agent, or Firm—Lynne M. Blank

(57) ABSTRACT

The present invention relates to a polymer microsphere comprising at least one polymer and at least one bound latent colorant, wherein the microsphere is stabilized by at least one stabilizing polymer. The invention also includes a method of preparing polymer microspheres comprising combining latent colorant, ethylenically unsaturated monomer, stabilizing polymer, and an initiator in solvent and initiating polymerization to form a polymeric microsphere stabilized by a stabilizing polymer bound to the surface of the polymeric microsphere.

39 Claims, No Drawings

POLYMER MICROSPHERES CONTAINING LATENT COLORANTS AND METHOD OF PREPARATION

CROSS REFERENCE TO RELATED APPLICATIONS

Reference is made to commonly assigned, co-pending U.S. Patent Applications:

Ser. No. 10/625,637 by Schroeder et at. filed of even date herewith entitled "Colorable Polymeric Particles With Biological Probes"; and Ser. No. 10/625,424 by Qiao et al. filed of even date herewith entitled "Colorable Microspheres For DNA And Protein Microarray", the disclosures of which are incorporated herein.

FIELD OF THE INVENTION

The present invention relates to large polymer microspheres containing latent colorants, especially couplers, which may optionally include bioaffinity tags, and methods for their preparation.

BACKGROUND OF THE INVENTION

High density arrays formed by spatially addressable synthesis of bioaffinity tags on a 2-dimensional solid support have greatly enhanced and simplified the process of biological research and development, since they were invented in the early 1990s. See Science, 251, 767–773, 1991. The key to current microarray technology is deposition of a bioactive agent at a single spot on a microchip in a "spatially addressable" manner.

Current technologies have used various approaches to fabricate microarrays. For example, U.S. Pat. Nos. 5,412,087, and 5,489,678 demonstrate the use of a photolithographic process for making peptide and deoxyribonucleic acid (DNA) microarrays. The patents teach the use of photolabile protecting groups to prepare peptide and DNA microarrays through successive cycles of deprotecting a defined spot on a 1 cm×1 cm chip by photolithography, then flooding the entire surface with an activated amino acid or DNA base. Repetition of this process allows construction of a peptide or DNA microarray with thousands of arbitrarily different peptides or oligonucleotide sequences at different spots on the array. This method is expensive.

An ink jet approach is being used by others, for example, in U.S. Pat. Nos. 6,079,283, 6,083,762, and 6,094,966, to fabricate spatially addressable arrays, but this technique also suffers from high manufacturing cost in addition to the relatively large spot size of 40 to 100 μm. Because the number of bioaffinity tags to be placed on a single chip usually runs anywhere from 1000 to 100000 probes, the spatial addressing method is intrinsically expensive regardless of how the chip is manufactured.

An alternative approach to the spatially addressable method is the concept of using fluorescent dye incorporated polymeric microspheres to produce biological multiplexed arrays. U.S. Pat. No. 5,981,180 discloses a method of using color coded microspheres in conjunction with flow cytometry to perform multiplexed biological assay. Microspheres conjugated with DNA or monoclonal antibody probes on their surfaces were dyed internally with various ratios of two distinct fluorescence dyes. Hundreds of "spectrally addressed" microspheres were allowed to react with a biological sample and the "liquid array" was analyzed by passing a single microsphere through a flow cytometry cell to decode sample information.

U.S. Pat. Nos. 6,023,540 and 6,266,459 disclose the use of fiberoptic bundles with pre-etched microwells at distal ends to assemble dye loaded microspheres. The surface of each spectrally addressed microsphere was attached with a unique bioactive agent and thousands of microspheres carrying different bioaffinity tags combined to form "microspheres array" on pre-etched microwells of fiber optical bundles. More recently, a novel optically encoded microsphere approach was accomplished by using different sized zinc sulfide-capped cadmium selenide nanocrystals incorporated into microspheres. See Nature Biotech. 19, 631–635, (2001). Given the narrow band width demonstrated by these nanocrystals, this approach significantly expands the spectral bar coding capacity in microspheres.

Even though the "spectrally addressed microsphere" approach does provide an advantage in terms of its simplicity over the old fashioned "spatially addressable" approach in microarray making, there remains a need in the art to make the manufacture of biological microarrays less difficult and less expensive and to provide nucleic acid identification systems that are accurate, less complex and less expensive.

One particular problem associated with "spectrally addressed microspheres" lies in the fact that colored compounds typically used in the microspheres are often fluorescent, and hence will provide excessive "background noise" when fluorimetric determinations are performed on the microarray. Another problem inherent in the use of both colorants and latent colorants in polymer microspheres is their propensity to crystallize at the surface of the microspheres or completely or partially wash out of the microspheres. This can provide a hue shift and thus can be a major source of error for this technique. The spatial accessibility of the microsphere's bioaffinity tags to analytes is another area where improvements are needed. Advances in this area can lead to enhanced loading of the tags onto the microspheres and hence a more sensitive array. In addition to the requirements listed, polymer microspheres, which are to be resolved using optical methods, must be relatively monodisperse and must have a diameter of 0.5–50 microns. There are few preparative methods, which can produce polymer microspheres that can fulfill all of these criteria simultaneously.

Macromolecular Rapid Communications Vol. 15 p. 909–915 (1994) reports the immobilization of enzymes to soluble stabilizing polymer arms protruding from the surface of a polymer particle. Enhancements in accessibility of the enzyme to target substrates is observed over enzymes covalently bound directly to the particle/microsphere surface. In this study, however, the enzyme was reversibly adsorbed to the stabilizer arms and was not covalently bound. Furthermore, these polymer microspheres do not contain latent colorants.

JP 2000 178309 discloses highly monodisperse 5–200 micron microspheres with biological macromolecules attached to the surface. The microspheres additionally contain dyes. The dyes described are colorants, not latent colorants and hence will create difficulties when used in bioarrays due to their fluorescence. Furthermore, the method of preparation is laborious.

U.S. Pat. No. 4,837,168 discloses latex particles with biological macromolecules bound to the surface. These particles contain photographic couplers covalently incorporated within the particle structure. These particles, however, are smaller than 100 nanometers. The method of preparation is emulsion polymerization, which will not yield 0.5–20 micron monodisperse particles. Furthermore, these particles are not stabilized by soluble polymers grafted to the surface, but by low molecular weight surfactants.

Many patents exist which disclose latex particles containing photographic couplers. A few representative examples are U.S. Pat. Nos. 3,767, 412, 4,444,870, 6,203,973 and 4,080,211. The disclosed particles are used for silver halide systems, and small particles sizes are necessary. These patents employ preparative methods, such as emulsion polymerization, which yield much smaller particles. Furthermore, the particles described are stabilized by surfactants and not soluble polymers.

In order to use optical imaging to read the test results, the microspheres used should most desirably be 2–20 microns and relatively monodisperse, in addition to containing the latent colorant. There are few methods, which may produce microspheres, which meet all of these specifications.

PROBLEM TO BE SOLVED

The problem to be solved is the preparation of polymer microspheres, useful in biological microarrays, which have a simultaneous combination of desirable properties, making them uniquely well suited for this application. These properties include high monodispersity, a diameter of between 0.5 and 50 microns, easily accessible biological affinity probes bound to the microsphere, and a latent colorant to serve as a colorimetric bar code which does not produce interfering fluorescing signals during biological assays.

SUMMARY OF THE INVENTION

The present invention relates to a polymer microsphere comprising at least one polymer and at least one bound latent colorant, wherein the microsphere is stabilized by at least one stabilizing polymer. The invention also includes a method of preparing polymer microspheres comprising combining latent colorant, ethylenically unsaturated monomer, stabilizing polymer, and an initiator in solvent and initiating polymerization to form a polymeric microsphere stabilized by a stabilizing polymer bound to the surface of the polymeric microsphere.

ADVANTAGEOUS EFFECTS OF THE INVENTION

The present invention includes several advantages, not all of which are incorporated in a single embodiment. In one advantage, the microsphere of the present invention may overcome one particular problem associated with "spectrally addressed microspheres", wherein the colored compounds typically used in the microspheres are often fluorescent, and hence will provide excessive "background noise" when fluorimetric determinations are performed on the microarray. This problem may be overcome through the use of latent colorants, which are colorless and relatively non-emissive until "switched" to a colored state by a chemical reaction, a physical trigger, or some kind of environmental stimulus. In another advantage, the microspheres of the present invention may avoid the hue shift, a major source of error when both colorants and latent colorants in polymer microspheres demonstrate their propensity to crystallize at the surface of the microspheres or completely or partially wash out of the microspheres. In another advantage of the present invention, enhanced loading of the tags, achieved by the attachment of the tags to a polymer scaffold extending from the surface of the microspheres rather than attachment of the tags directly to the microsphere's surface, may produce a more sensitive array. In addition, the polymer microspheres of the present invention, which may be resolved using optical methods, may be relatively monodisperse and may have a diameter of 0.5–50 microns. The method of the present invention is relatively simple compared to methods of the prior art while allowing a number of synthetic degrees of freedom.

DETAILED DESCRIPTION OF THE INVENTION

The present invention comprises a polymer microsphere stabilized by a stabilizing polymer and comprising a bound latent colorant.

These microspheres will have a mean diameter of from 1 to 100 microns. Preferably, the mean diameter will be from 2 to 30 microns. Most preferably, the mean diameter will be from 3 to 20 microns. Preferably these microspheres will be monodisperse or relatively monodisperse. By "monodisperse" it is meant that the coefficient of the particle, typically referred to herein as microsphere, size distribution, that is, the standard deviation as a percentage of the mean, will be less than 20%. Preferably, the coefficient of variation will be less than 15%. Most preferably, the coefficient of variation will be less than 10%.

The particular polymer or combination of polymers which comprise the microspheres are water insoluble synthetic polymers. Preferably this polymer will be an addition polymer of monomers containing $\alpha,\beta$-ethylenic unsaturation. These include, but are not necessarily limited to, methacrylic acid esters, such as methyl methacrylate, ethyl methacrylate, isobutyl methacrylate, 2-ethylhexyl methacrylate, benzyl methacrylate, phenoxyethyl methacrylate, cyclohexyl methacrylate and glycidyl methacrylate, acrylate esters such as methyl acrylate, ethyl acrylate, isobutyl acrylate, 2-ethylhexyl acrylate, benzyl methacrylate, phenoxyethyl acrylate, cyclohexyl acrylate, and glycidyl acrylate, styrenics such as styrene, $\alpha$-methylstyrene, 3- and 4-chloromethylstyrene, halogen-substituted styrenes, and alkyl-substituted styrenes, vinyl halides and vinylidene halides, N-alkylated acrylamides and methacrylamides, vinyl esters such as vinyl acetate and vinyl benzoate, vinyl ether, allyl alcohol and its ethers and esters, and unsaturated ketones and aldehydes such as acrolein and methyl vinyl ketone, isoprene, butadiene and acrylonitrile. Preferably, the monomers will be styrenics or acrylic esters or methacrylic esters. Also, the monomer comprises a monomer having limited solubility in water.

In addition, small amounts, typically less than 10% of the total weight of the polymerizeable solids, of one or more water-soluble ethylenically unsaturated monomer may be used. Such monomers include, but are not necessarily limited to, styrenics, acrylates, and methacrylates substituted with highly polar groups, unsaturated carbon and heteroatom acids such as acrylic acid, methacrylic acid, fumaric acid, maleic acid, itaconic acid, vinylsulfonic acid, vinylphosphonic acid, and their salts, vinylcarbazole, vinylimidazole, vinylpyrrolidone, and vinylpyridines.

The polymer microspheres of this invention may further comprise monomers containing at least two ethylenically unsaturated chemical functionalities. These functionalities may be vinyl groups, acrylates, methacrylates, vinyl ethers and vinyl esters. Monomers include, but are not limited to trimethylolpropane triacrylate, ethylene glycol dimethacrylate, isomers of divinylbenzene, and ethylene glycol divinyl ether. These monomers are preferably used as 0–10% of the total weight of the polymer microspheres. Most preferably they are present as 0–2% of the total weight of the polymer microspheres. In a preferred embodiment, the polymer microsphere comprises at least one water insoluble monomer and at least one water soluble monomer.

These microspheres are stabilized by at least one stabilizing polymer which may be covalently grafted, chemisorbed, or physically adsorbed to the external surface of the microsphere. The stabilizing polymer is most desirably soluble in the solvent in which the microspheres are prepared, typically water or a water miscible solvent, and may be linear or branched. The stabilizing polymer may be a homopolymer or a copolymer, which includes random, block, and graft copolymers. The stabilizing polymer may have a molecular weight of from 500–1,000,000 atomic mass units, hereinafter referred to as AMU. Preferably, the molecular weight will be between 2,000 and 500,000 AMU. Most preferably, the stabilizing polymer will have a molecular weight between 5,000 and 250,000 AMU. Preferably the stabilizing polymer contains chemically reactive groups which may allow for the attachment of other molecules. This reactive unit may be, but is not necessarily limited to, an aldehyde, epoxy, hydrazide, vinyl sulfone, succinimidyl ester, carbodiimide, maleimide, dithio, iodoacetyl, isocyanate, isothiocyanate, aziridine. Other functionalities, which may allow for the attachment of other molecules through the use of a coupling agent or further chemical reactants include primary, secondary, or tertiary amines, thiols, alcohols, or carboxylic acids. Preferably the reactive unit is a primary or secondary amine, a vinylsulfonyl, or a carboxylic acid. Specific stabilizing polymers which may be used for this purpose may be selected from the set consisting of, but not necessarily limited to, poly(propyleneimine) and polymers and copolymers of N-aminopropyl (meth) acrylamide and secondary amine derivatives thereof, N-aminoethyl (meth)acrylate and secondary amine forms thereof, diallyamine, vinylbenzylamine, vinylamine, (meth) acrylic acid, vinylbenzyl mercaptan, and hydroxyethyl (meth)acrylate. Preferably, the stabilizing polymer is poly(vinylamine), poly(propyleneimine), or poly(N-aminopropyl methacrylamide), polyacrylic acid, or polymethacrylic acid.

The polymer microspheres of this invention further contain latent colorants which are grafted or bound, preferably covalently grafted or bound, to the outer or exterior surface of the microsphere or are polymerized into the microspheres itself. Latent colorants include chemical species which are colorless yet may be readily transformed into a colored state or species when exposed to specific "activating" conditions, such as complexation with a metal ion, an increase or decrease in temperature, a change in pH, exposure to oxidants or reductants, irradiation, or exposure to specific chemical species, such as oxidized photographic developer. Preferred latent colorants may be, but are not necessarily limited to, leuco dyes, photochromic dyes, thermochromic materials, metal complexes, and couplers, preferably colored couplers, which, for purposes of the present invention, are defined as colorless materials that, when reacted with another compound, produces a measurable spectral shift. Especially preferred are photographic couplers. The latent color forming compounds useful in this invention additionally contain chemical moieties allowing for their covalent attachment to the polymeric structure of the microspheres. This attachment may be performed either during or after the preparation of the polymer microspheres. Preferably this chemical moiety includes polymerizeable ethylenic unsaturation. After incorporation into the microspheres, the latent colorants exist as units pendant from the polymer backbone.

Couplers containing ethylenic unsaturation are known in the art. Examples of these compounds are described in U.S. Pat. No. 3,767,412, U.S. Pat. No. 4,444,870, U.S. Pat. No. 4,837,168 and U.S. Pat. No. 4,080,211 and are incorporated herein by reference. The couplers containing ethylenic unsaturation are capable of forming a dye upon coupling with an oxidation product of an aromatic primary amine developing agent. These couplers may be represented by the following general formula (I).

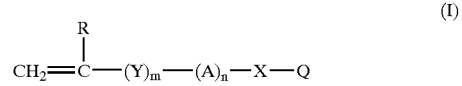

(I)

wherein R represents a hydrogen atom, a lower alkyl group containing from 1 to 4 carbon atoms, or a chlorine atom, X represents —CONH—, —NHCONH—, —NHCOO—, —COO—, —SO$_2$—, —CO— or —O—, Y represents —CONH— or —COO—, A represents an unsubstituted or substituted alkylene group containing from 1 to 10 carbon atoms which may be a straight chain or a branched chain or an unsubstituted or substituted phenylene group, for example, methylene, dimethylmethylene, dimethylene, trimethylene, decylmethylene, Q represents a cyan color forming coupler residue, a magenta color forming coupler residue or a yellow color forming coupler residue each of which is capable of forming a dye upon coupling with an oxidation product of an aromatic primary amine developing agent, m represents 0 to 1, and n represents 0 or 1.

Substituents for the alkylene group or the phenylene group represented by A include an aryl group, for example, a phenyl group, a nitro group, a hydroxy group, a cyano group, a sulfo group, an alkoxy group, for example, a methoxy group, an aryloxy group, for example, a phenoxy group, an acyloxy group, for example, an acetoxy group, a acylamino group, for example, an acetylamino group, a sulfonamido group, for example, a methanesulfonamido group, a sulfamoyl group, for example, a methylsulfamoyl group, a halogen atom, for example, a fluorine atom, a chlorine atom, a bromine atom, a carboxy group, a carbamoyl group, for example, a methylcarbamoyl group, an alkoxycarbonyl group, for example, a methoxycarbonyl group, a sulfonyl group, for example, or a methylsulfonyl group. When two or more substituents are present, they may be the same or different.

Of the color forming coupler residues represented by Q, a phenol type residue represented by the general formula (II) described below and a naphthol type residue represented by the general formula (III) described below are preferred as a cyan color forming coupler residue.

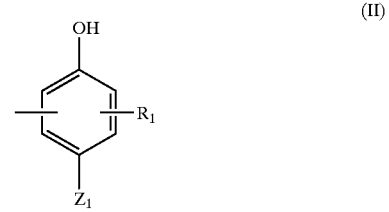

(II)

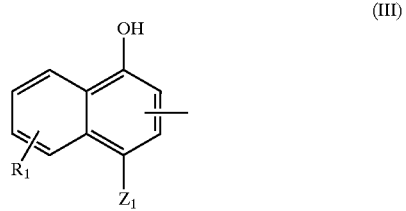

(III)

wherein R$_1$ represents a hydrogen atom, an alkyl group, an alkenyl group, an alkoxy group, an alkoxycarbonyl group, a halogen atom, an alkoxycarbamoyl group, an aliphatic amido group, an alkylsulfamoyl group, an alkylsulfonamido group, an alkylureido group, a arylcarbamoyl group, an arylamido group, an arylsulfamoyl group, an arylsulfonamido group or an arylureido group. When two or more these substituents are present, they may be the same or different.

$Z_1$ in the general formula (II) or (III) represents a hydrogen atom, a halogen atom, a sulfo group, an acyloxy group, an alkoxy group, an aryloxy group, a heterocyclic oxy group an alkylthio group, an arylthio group or a heterocyclic thio group, and these groups may be further substituted with an aryl group, for example, a phenyl group, a nitro group, a hydroxy group, a cyano group, a sulfo group, an alkoxy group, for example, a methoxy group, an aryloxy group, for example, a phenoxy group, an acyloxy group, for example, an acetoxy group, an acylamino group, for example, an acetylamino group, a sulfonamido group, for example, a methanesulfonamido group, a sulfamoyl group, for example, a methylsulfamoyl group, a halogen atom, for example, a fluorine atom, a chlorine atom, or a bromine atom, a carboxy group, a carbamoyl group, for example, a methylcarbamoyl group, an alkoxycarbonyl group, for example, a methoxycarbonyl group, or a sulfonyl group, for example, a methylsulfonyl group.

Preferred examples of magenta color forming coupler residues include a pyrazolone type residue and an indazolone type residue. For example, a residue represented by the following general formula (IV) is preferred.

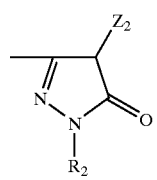

(IV)

wherein $R_2$ represents a substituent well known as a substituent at the 1-position of a 2-pyrazolin-5-one coupler, for example, an alkyl group, a substituted alkyl group, for example, a haloalkyl group such as a fluoroalkyl group, a cyanoalkyl group, or a benzylalkyl group, an aryl group or a substituted aryl group. Substituents for the aryl group include an alkyl group, for example, a methyl group or an ethyl group, an alkoxy group, for example, a methoxy group or an ethoxy group, an aryloxy group, for example, a phenoxy group, an alkoxycarbonyl group, for example, a methoxycarbonyl group, an acylamino group, for example, an acetylamino group; a carbamoyl group, an alkylcarbamoyl group, for example, a methylcarbamoyl group, an ethylcarbamoyl group; a dialkylcarbamoyl group, for example, a dimethylcarbamoyl group; an arylcarbamoyl group, for example, a phenylcarbamoyl group; an alkylsulfonyl group, for example, a methylsulfonyl group; an arylsulfonyl group, for example, a phenylsulfonyl group; an alkylsulfonamide group, for example, a methanesulfonamido group; an arylsulfonamido group, for example, a phenylsulfonamido group; a sulfamoyl group, an alkylsulfamoyl group, for example, an ethylsulfamoyl group; a dialkylsulfamoyl group, for example, a dimetbylsulfamoyl group; an alkylthio group, for example, a methylthio group; an arylthio group, for example, a phenylthio group; a cyano group, a nitro group, or a halogen atom, for example, a fluorine atom, a chlorinc atom, or a bromine atom. When two or more substituents are present, they may be the same or different. Particularly preferred substituents for the aryl group include a halogen atom, an alkyl group, an alkoxy group, an alkoxycarbonyl group and a cyan group.

$Z_2$ in the general formula (IV) represents a hydrogen atom or a releasing group which is connected to the coupling position of the color forming coupler through an oxygen atom, a nitrogen atom or a sulfur atom. When $Z_2$ represents a releasing group connected to the coupling position through an oxygen atom, a nitrogen or a sulfur atom, each of these atoms is bonded to an alkyl group, an aryl group, an alkylsulfonyl group, an arylsulfonyl group, an alkylcarbonyl group, an arylcarbonyl group or a heterocyclic group and the alkyl group, the aryl group and the heterocyclic group may be substituted with a substituent defined as the substituent for the aryl group represented by $R_2$ above. Further, when $Z_2$ represents a releasing group connected to the coupling position through a nitrogen atom, $Z_2$ represents a 5-membered or 6-membered heterocyclic group containing the nitrogen atom, for example, an imidazolyl group, a pyrazolyl group, a triazolyl group, or a tetrazolyl group.

As a yellow color forming coupler residue, an acylacetanilide type residue, and particularly a pivaloylacetanilide type residue represented by the general formula (V) described below and a benzoylacetanilide type residue represented by the general formula (VI) or (VII) described below are preferred.

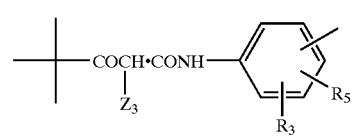

(V)

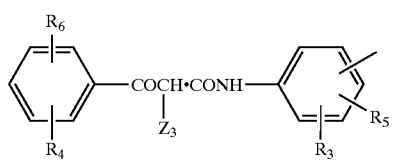

(VI)

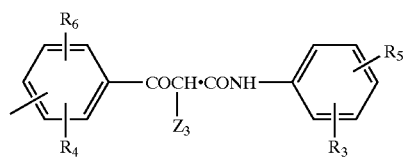

(VII)

wherein $R_3$, $R_4$, $R_5$ and $R_6$, which maybe the same or different, each represents a hydrogen atom or a well known substituent for a yellow color forming coupler, for example, an alkyl group, an alkenyl group, an alkoxy group, an alkoxycarbonyl group, a halogen atom, an alkoxycarbamoyl group, an aliphatic amido group, an alkylsulfamoyl group, an alkylsulfonamido group, an alkylureido group, an alkyl substituted succinimido group, an aryloxy group, an aryloxycarbonyl group, an arylcarbamoyl group, an arylamido group, an arylsulfamoyl group, an arylsulfonamido group, an arylureido group, a carboxy group, a sulfo group, a nitro group, a cyano group, a thiocyano group.

$Z_3$ in the general formula (V), (VI) or (VII) represents a hydrogen atom or a group represented by the general formula(VIII), (IX), (X) or (XI).

(VIII)

wherein $R_7$ represents an unsubstituted or substituted aryl group or an unsubstituted or substituted heterocyclic group.

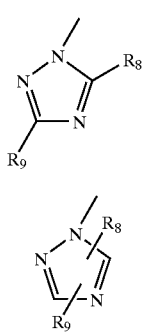

(IX)

(X)

wherein $R_8$ and $R_9$, which may be the same or different, each represents a hydrogen atom, a halogen atom, a carboxylic acid ester group, an amino group, an alkyl group, an alkylthio group, an alkoxy group, an alkylsulfonyl group, a carboxylic acid group, a sulfonic acid group, an unsubstituted or substituted aryl group or an unsubstituted or substituted heterocyclic group.

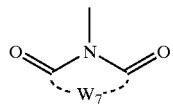

(XI)

wherein $W_7$ represents non-metallic atoms necessary to form a 4-membered ring, a 5-membered ring or a 6-membered ring together with

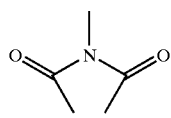

Of the groups represented by the general formula (XI), a preferred group is represented by the following general formula (XII), (XIII) or (XIV):

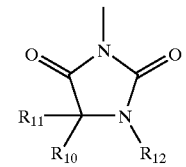

(XII)

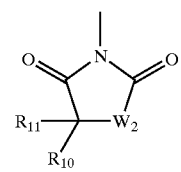

(XIII)

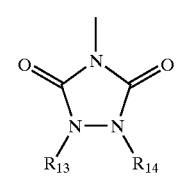

(XIV)

wherein $R_{10}$ and $R_{11}$, which may be the same or different, each represents a hydrogen atom, an alkyl group, an aryl group, an alkoxy group, an aryloxy group or a hydroxy group, $R_{12}$, $R_{13}$ and $R_{14}$, which may be the same or different, each represents a hydrogen atom, an alkyl group, an aryl group, an aralkyl group or an acyl group, and $W_2$ represents an oxygen atom or a sulfur atom.

Table of Couplers: Structures of Couplers Containing Polymerizable Ethylenic Unsaturation.

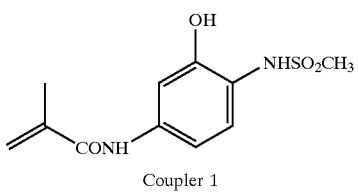

Coupler 1

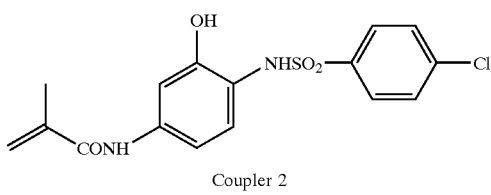

Coupler 2

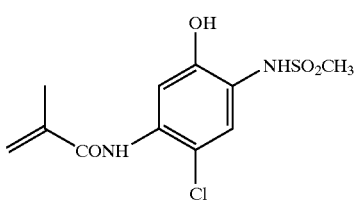

Coupler 3

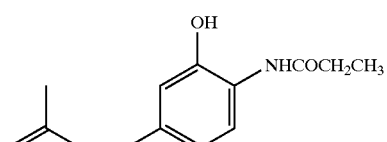

Coupler 4

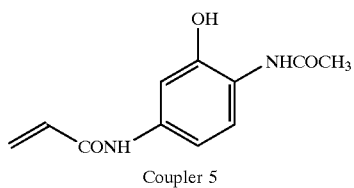
Coupler 5
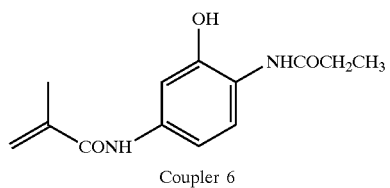
Coupler 6
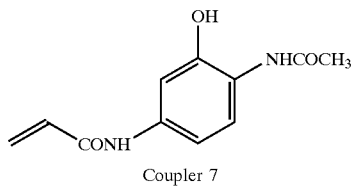
Coupler 7
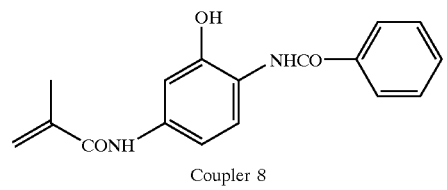
Coupler 8
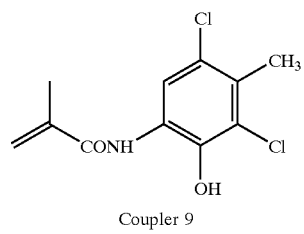
Coupler 9
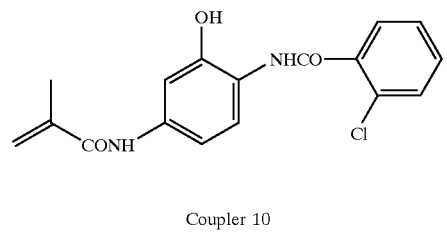
Coupler 10
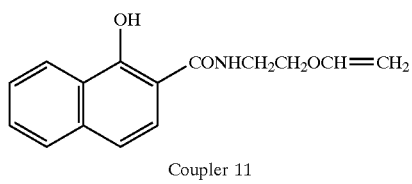
Coupler 11
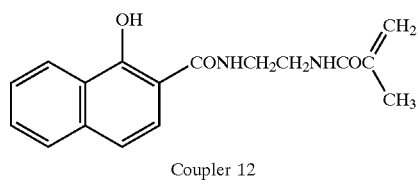
Coupler 12
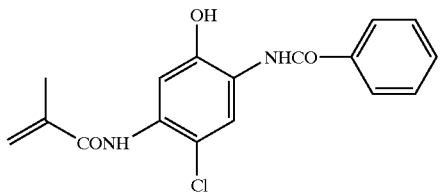
Coupler 13
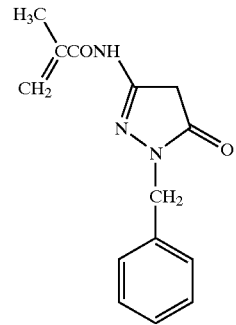
Coupler 14
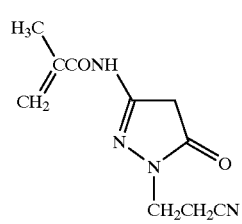
Coupler 15
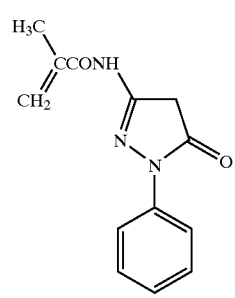
Coupler 16

-continued
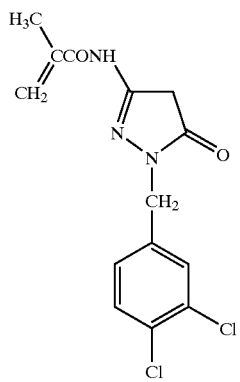
Coupler 17
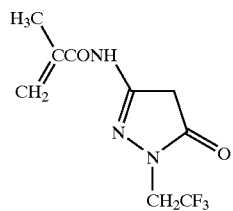
Coupler 18
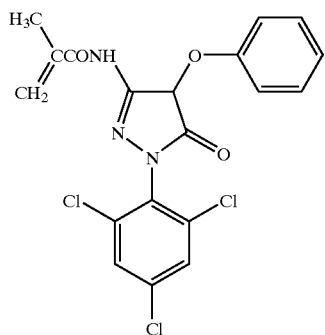
Coupler 19
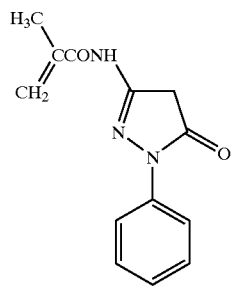
Coupler 20
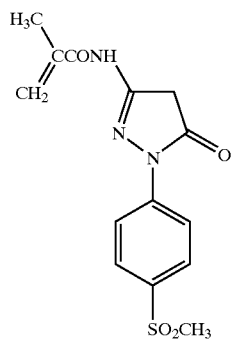
Coupler 21
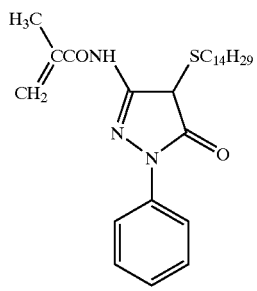
Coupler 22
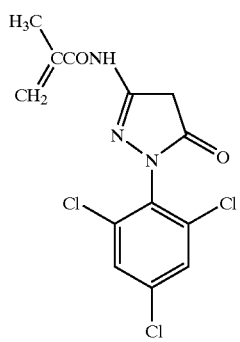
Coupler 23
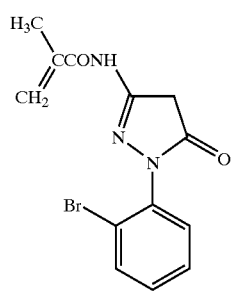
Coupler 24

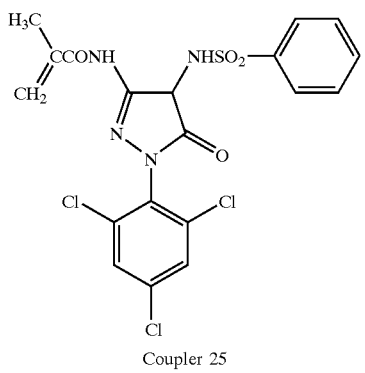
Coupler 25
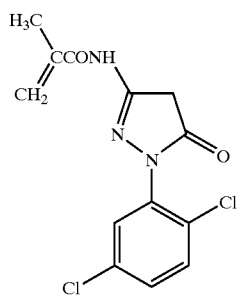
Coupler 26
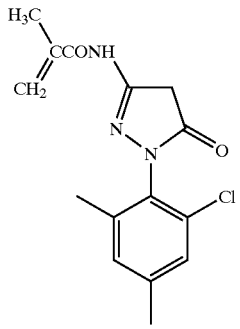
Coupler 27
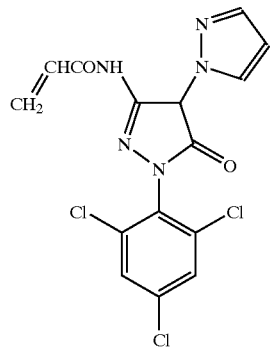
Coupler 28
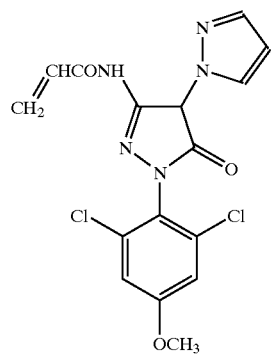
Coupler 29
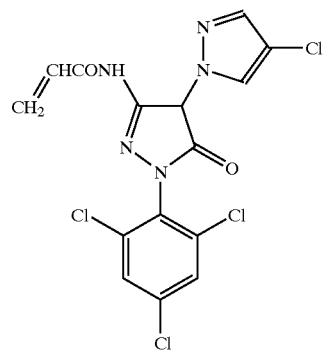
Coupler 30
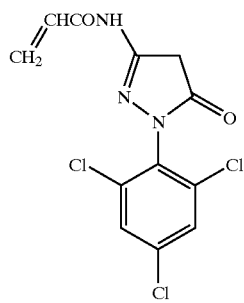
Coupler 31
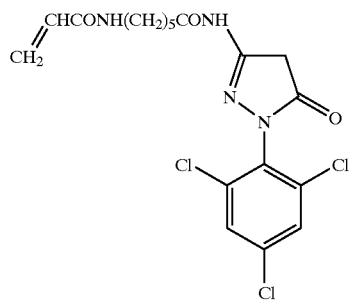
Coupler 32

-continued
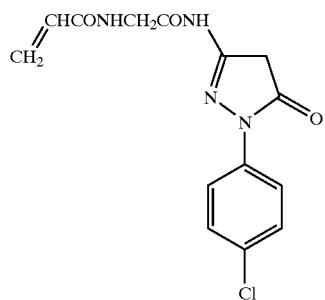
Coupler 33
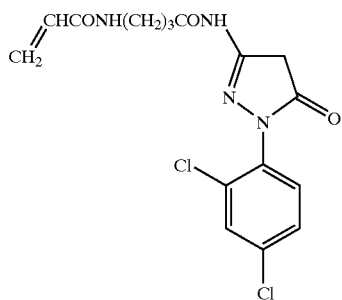
Coupler 34
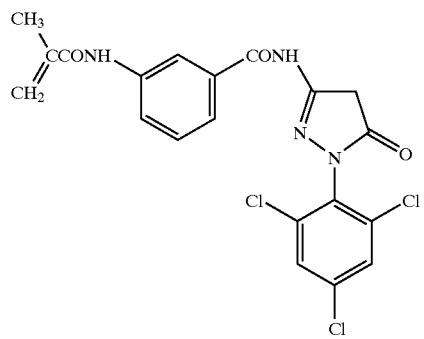
Coupler 35
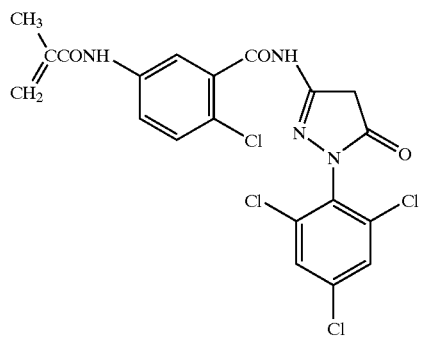
Coupler 36
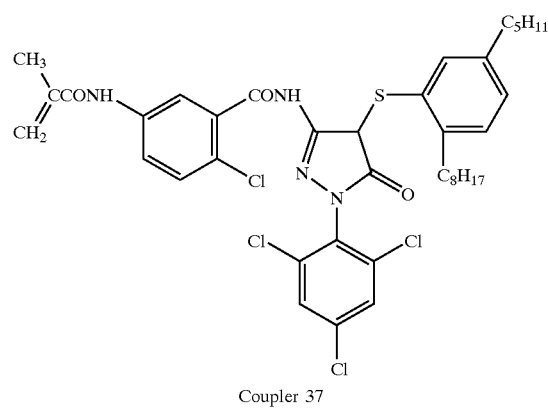
Coupler 37
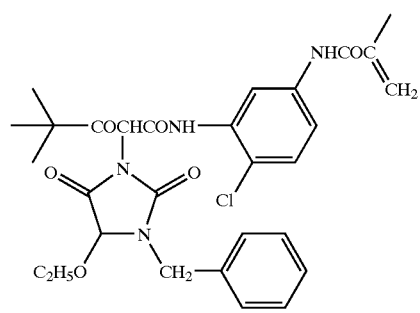
Coupler 38
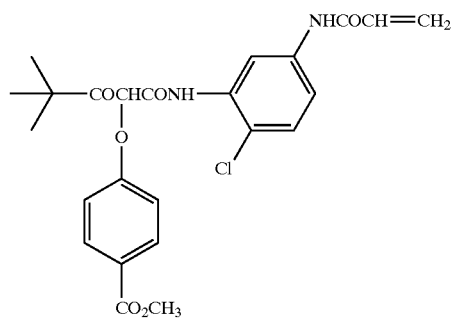
Coupler 39
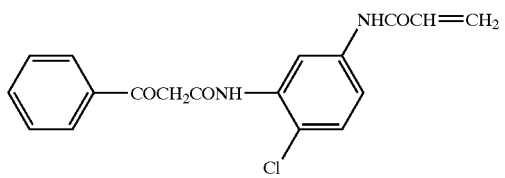
Coupler 40

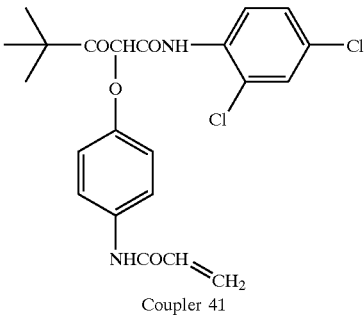

Coupler 41

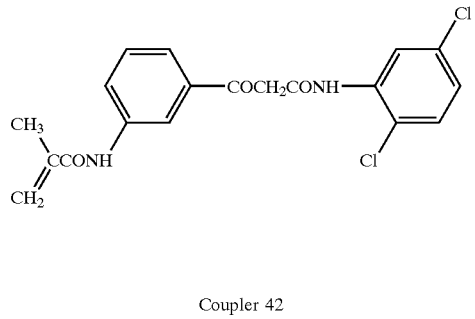

Coupler 42

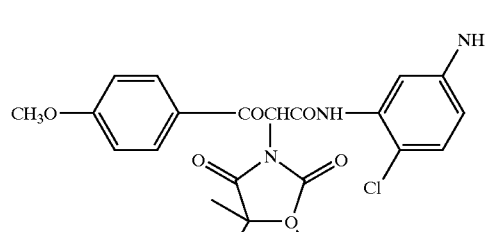

Coupler 43

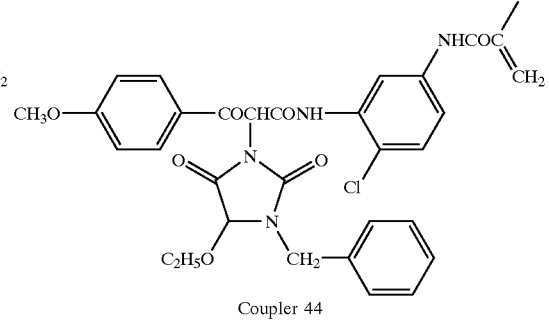

Coupler 44

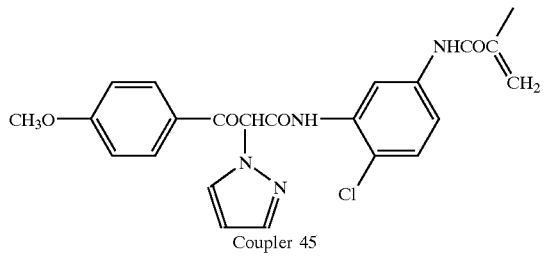

Coupler 45

Photochromic dyes, which contain polymerizable ethylenic unsaturation, may be used in this invention as latent colorants. These compounds are known in the art. WO 97/05213 and W/O 98/28289 both describe such materials and are incorporated by reference herein. This class of polymerizeable dyes may be represented by a monomer having the formula (XV):

$P-(S)_n-R_{14}$ wherein n is an integer of 0 to 5, P is a photochromic dye moiety or derivative thereof, S is an organic spacer group, and $R_{14}$ is a polymerizable group. The photochromic dye moiety or derivative P may be of any suitable type. An hydroxy derivative may be used. P may be derived from a photochromic dye selected from one or more of the group consisting of anthraquinones, phthalocyanines, spirooxazines, chromenes, pyrans including spiro- pyrans and fulgides. A spiro-oxazine residue is preferred.

Preferred photochromic dyes may be selected from 1,3-dihydrospiro[2H-anthra[2,3-d]imidazole-2,1'-cyclohexane]-5,10-dione, 1,3-dihydrospiro[2H-anthra[2,3-d]imidazole-2,1'-cyclohexane]-6,11-dione, 1,3-dihydro-4-(phenylthio)spiro[2H-anthra'1,2-d]imidazole-2,1-cyclohexane]-6,11-dione, 1,3-dihydrospiro[2-H-anthra[1,2-d]imidazole-2,1'-cycloheptane]-6,11-dione, 1,3,3-trimethylspiroindole-2,3-[3naphtho[2,1-b]-1,4-oxazine], 1,3,3-trimethyl-9'-hydroxyspiroindolinenaphthoxadine, 1,3,3-trimethyl-9'-(2-hydroxyethyloxy)-spiroindolinenaphthoxadine, 1,3,3-trimethyl-6'-piperidino-9'-hydroxy-spiroihdolinenaphthoxadine, 2-methyl-3,3'-spirobi [3H-naphtho[2,1-b]pyran](2-Me), 2-phenyl-3-methyl-7-methoxy-8'-nitrospiro[4H-1-benzopyran-4,3'-[3H]-naphtho]2,1-b]pyran, Spiro[2H-1-benzopyran-2,9'-xanthene], 8-methoxy-1',3-dimethylspiro(2H-1-benzopyran-2,2'-(1'H)-quinoline, 2,2'-Spirobi[2H-1-benzopyran], 5'-amino-1',3',3'-trimethylspiro[2H-1-benzopyran-2,2'-indoline], Ethyl-p-methyl-p-(3',3'-dimethyl-6-nitrospiro(2H-1-benzopyran-2,2'-indolin-1'-yl)-propenoate, (1,3-propanediyl)bis[3',3'-dimethyl-6-nitrospiro[2H-1-benzopyran-2,2'-indoline], 3,3'-dimethyl-6-nitrospiro[2H-1-benzopyrao-2,2'-benzoxazoline], 6'-methylthio-3,3-dimethyl-8-methoxy-6-nitrospiro[2H-1-benzopyran-2,2'-benzothiozoline], (1,2-ethanediyl)bis[8-methoxy-3-methyl-6-nitrospiro[2H-1-benzopyran-2,2'-benzothiozoline], N-N'-bis(3,3'-dimethyl-6-nitrospiro[2H-1-benzopyran-2,2'(3'H)-benzothioazol-6'-yl]decanediamide, α-(2,5-dimethyl-3-furyl)ethylidene(Z)-ethylidenesuccinicanhydride,α-(2,5-dimethyl-3-furyl)-(α',8-dimethylfulgide), 2,5-diphenyl-4-(2'-chlorophenyl)imidazole, ((2',4'-dinitrophenyl)methyl]-1H-benzimidazole, N-N-diethyl-2-phenyl-2H-phenanthro[9,10-d]imidazol-2-amine, and 2-Nitro-3-aminofluoren2-amino4-(2'-furanyl)-6H-1,3-thiazine-6-thione.

The selection of photochromic dye moiety, which may be used, may extend to conventional tinting dyes. The polymerizable group $R_{14}$ may be any reactive group capable of forming a polymer. An ethyleneically unsaturated group is preferred. An olefinic, allylic, polythiol, vinyl, acrylic or polyisocyanate group may be used. An acrylic or methacrylic group is preferred. An acrylate or methacrylate ester may be used. The polymerisable group $R_{14}$ may function to improve the solubility of the photochromic monomer in the monomer mix. The organic spacer group S, when present, may be of any suitable type. The group S may be selected from the group consisting of alkyl of 1 to 25 carbon atoms, preferably 1 to 6 carbon atoms, alkoxy of 1 to 25 carbon atoms, preferably 1 to 6 carbon atoms, and aryl or heterocyclic groups of 5 to 10 carbon atoms, with or without substituents selected from halogen, hydroxy, amine, acyl or carbonyl groups. The organic spacer group S may function to firther improve the solubility of the photochromic monomer in the monomer mix, where required.

A preferred photochromic monomer is selected from the group consisting of an ethoxy methacrylate derivative of 1,3-dihydrospiro[2H-anthra[2,3-d] imidazole-2,1-cyclohexane]-5,10-dione, an acrylate derivative of 1,3,3-trimethyl-9'-hydroxyspiroindolinenaphthoxadine, a methacrylate derivative of 1,3,3-trimethyl-9'-(2-hydroxyethyloxy)-spiroindoline naphthoxadine and an acrylate derivative of 1,3,3-trimethyl-6'-piperidino-9'-hydroxyspiroindoline naphthoxadine.

In a preferred aspect of the present invention there is provided a photochromic monomer having the formula

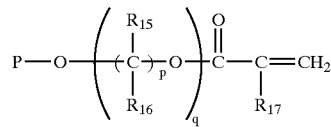

wherein P is a photochromic dye derivative from a photochromic dye selected from one or more of the group consisting of anthraquinones, phthalocyanines, spiro-oxazines, chromenes, pyrans including spiro-pyrans and fulgides, q is an integer of 0 to 5, p is an integer of 1 to 10, $R_{15}$ and $R_{16}$, which may be the same or different, are selected from hydrogen, halogen and an alkyl or substituted alkyl of 1 to 10 carbon atoms, or $-(CR_{15}R_{16})p-$ is an aryl or heterocyclic group of 5 to 10 carbon atoms, and $R_{17}$ is selected from hydrogen, halogen, alkyl or substituted alkyl of 1 to 10 carbon atoms or alkoxy, or substituted alkoxy or 1 to 10 carbon atoms. Preferably, $R_{15}$, $R_{16}$ and $R_{17}$ are selected from the group consisting of 2 hydrogen and alkyl or 1 to 5 carbon atoms.

Latent colorants are known in the art which are changed from an uncolored to a colored form by the action of acid and additionally contain polymerizeable ethylenic unsaturation. Leuco dyes are compounds, which can switch between colored and uncolored forms reversibly. Similarly, colorless compounds are known in the art, which contain acid-labile protecting groups such as t-butyl esters, carbamates, and carbonates. Such compounds undergo acid-initiated deprotection under acidic conditions to afford colored compounds irreversibly. These polymerizeable latent colorants may be represented by the same chemical structure as Structure I except that Q will be a leuco dye or a colorless compounds which undergo irreversible thermal deprotection under acidic conditions to afford a colored compound. Japanese patents JP 61230981 and JP 2000296596 both describe such materials and are incorporated by reference herein.

The microspheres of the present invention may also comprise a tag, preferably bioaffinity tags, which are covalently bound to the external or outside surface of the microsphere. Preferably the tag is bound to the stabilizing polymer of the microsphere. As used herein, bioaffinity tag means a molecule or a complex of molecules that can bind to a biological analyte molecule with high affinity and high specificity, wherein analyte refers to a molecule, such as a polypeptide, polynucleotides, polysaccharides, enzymes, antibodies, or other metabolites with biological significance, whose presence, amount, and/or identity are to be determined. Typically it is desirable to have an affinity binding constant between a bioaffinity tag and target analyte greater than $10^6$ $M^{-1}$. Some commonly used bioaffinity tags may include, but are not limited to polynucleotides, polypeptides, polysaccharides, and small synthetic molecules which are capable of interacting specifically with certain biological analytes. Preferred bioaffinity tags are nucleic acids and proteins.

Nucleic acids are biological molecules that carry genetic information. There are two basic kinds of nucleic acids and they are deoxyribonucleic acid (DNA) and ribonucleic acid (RNA). A DNA molecule consists of four nucleotide bases, A, T, G, and C, which are connected in linear manner covalently, and a RNA molecule consists of four bases, A, U, G, and C, which are connected in linear manner covalently. The interaction among four bases follows the "Watson-Crick" base pairing rule of A to T (U) and G to C mediated by hydrogen bonds. When two single strand DNA molecules having a perfect "Watson-Crick" base paring match, they are referred as a complementary strand. The interaction between two complementary strands is termed hybridization. As such, a single-stranded DNA or RNA may be used as a bioaffinity tag to interact with its complementary strand. Sometimes, the complementary strand may contain one or more base-pairing mismatches as well.

Some commonly used nucleic acid bioaffinity tags, which may used in the invention include, but not limited to, DNA and DNA fragments, RNA and RNA fragment, synthetic oligonucleotides, and peptide nucleic acids. In another embodiment of the invention, the nucleic acid sequence recognition units may be any protein scaffold or synthetic molecular moiety capable of recognizing a specific DNA sequence. A nucleic acid sequence recognition may be terminally modified to contain one or more than one chemical functional groups that may be used to attached to another molecule or a surface. Some commonly used terminal modification include, but not limited to, amino, thiol, carboxyl, biotin, and digoxigenin.

A protein molecule consists of 20 amino acids that are connected in linear manner covalently. Some proteins may be further modified at selected amino acids through post-translational processes that include phosphorylation and glycosylation. A protein molecule can be used as a bioaffinity tag. There are several classes of protein molecules that may be used as bioaffinity tags. Antibodies are a class of naturally occurring protein molecules that are capable of binding targets with high affinity and specificity. The properties and protocols of using antibody can be found in "*Using Antibodies; A Laboratory Manual*", (Cold Spring Harbor Laboratory Press, by Ed Harlow and David Lane, Cold Spring Harbor, N.Y. 1999). Antigens may also be used as bioaffinity tag if antibodies are intended analytes for detection. Protein scaffolds such as whole protein/enzyme or their fragments may be used as bioaffinity tags as well. Examples include phosphotases, kinases, proteases, oxidases, hydrolyases, cytokines, or synthetic peptides. Nucleic acid ligands may be used as bioaffinity tag molecules after in vitro selection and enrichment for their binding affinity and specificity to certain targets. The principle of such selection process can be found in *Science*, Vol. 249, 505–510, 1990 and *Nature*, Vol. 346, 818–822, 1990. U.S. Pat. No. 5,110,833 discloses an alternative class of synthetic molecules that can mimic antibody binding affinity and specificity and can be readily prepared by the so called Molecular Imprinting Polymer (MIP). This technology has been reviewed in *Chem. Rev.* Vol. 100, 2495–2504, 2000.

The polymer microspheres of this invention may be prepared using a variety of heterogeneous polymerization methods, which will be apparent to one skilled in the art. These methods include, but are not necessarily limited to, Ugelstad-type swelling methods, suspension polymerization, limited coalescence methods, and dispersion polymerization.

Ugelstad swelling methods are described in Ugelstad, J., Mork, P. C. "Swelling of Oligomer-Polymer Particles. New Methods of Preparation of Emulsions and Polymer Dispersion" *Advances in Colloid and Interface Science* 1979, 13, 101–140 and in Ugelstad, J., Kaggerud, K. H., Hansen, F. K., Berge, A. "Absorption of low molecular weight compounds in aqueous dispersions of polymer-oligomer particles, 2. A two step swelling process of polymer particles giving an enormous increase in absorption capacity" *Makromol. Chem* 1979, 180, 737–744 and are incorporated herein by reference. In this method, monodisperse seed particles are swelled by one or more monomers and a polymerization initiator. Polymerization is then initiated. Due to the fact that the seed particles may absorb more than 100 times their original volume of low molecular weight monomers, this method is particularly useful for the preparation of monodisperse particles of the size range useful for this invention. "Suspension polymerization" refers to a process in which a polymerizable liquid is dispersed as droplets in a continuous aqueous medium and polymerized under continuous agitation. Any of the initiators described below may be used in suspension, and miniemulsion/microsuspension polymerizations. Preferably, organic-soluble initiators will be used. Normally, this process is carried out in the presence of a "granulating agent", such as a lyophilic polymer, for example, starch, natural gums, or polyvinyl alcohol; or an insoluble fine powder such as calcium phosphate. These granulating agents help to obtain a dispersion of droplets of the polymerizable liquid but do not provide sufficient stabilization of the dispersion so that the dispersed droplets are stable in the absence of agitation. Therefore, in this method, it is necessary to carry out the polymerization under continuous high-energy mechanical agitation, since otherwise extensive coalescence of the droplets will occur, with separation of a bulk phase of the water immiscible, polymerizable material or the formation of large amounts of coagulum. Because this process depends on the details of the shear field in the reactor, and on the changing viscosity of the polymerizing dispersed phase, it is difficult to control reproducibly, is not readily scalable, and gives broad particle size distributions (PSDs). Under certain circumstances, however, it may be possible to obtain particle size distributions sufficient for the purposes of this invention. Suspension polymerization is further described in U.S. Pat. Nos. 5,889,285, 5,274,057, 4,601,968, 4,592,990, R. Arshady "Suspension, Emulsion, and Dispersion Polymerization: A methodological survey" *Colloid Polym. Sci.* 270: 717–732 (1992) and H. G. Yuan, G. Kalfas, W. H Ray *JMS-Rev. Macromol Chem. Phys.* C31 (2–3): 215 (1991). "Limited coalescence" refers to a specific type of suspension polymerization in much narrower particle size distributions may be obtained than in conventional suspension polymerization. This method employs a solid colloidal stabilizer to control both particle size and particle size distribution. One example of this type of process is described in U.S. Pat. Nos. 2,932,629, 5,133,992, and 4,148,741, which pertain to a suspension polymerization process where a solid colloidal stabilizer such as silica is used to limit the coalescence of droplets containing polymerizable monomer in an aqueous medium. In that process, a water-immiscible polymerizable liquid is sheared to form small droplets suspended in aqueous medium containing a water-dispersible water-insoluble solid colloid such as silica as the suspension stabilizer. The concentration and size of the colloid determines the size of the droplets. The colloid performs this function by adhering to the droplets at the water/monomer interface to form a layer on the surface of the droplets. After monomer droplets have coalesced with other droplets and have grown to a particular diameter, the presence of the layer of colloidal stabilizer particles on the surface of the droplets prevents them from further coalescing and increasing in diameter. In this way, all of the droplets tend to grow to approximately the same diameter, so that upon polymerization the resulting polymer particles have a narrow size distribution. This technique is particularly useful for preparing polymer microspheres of the size range which are useful for this invention.

For polymer microspheres prepared by suspension polymerization, limited coalescence, or Ugelstad swelling, the affixing of the soluble polymer to the surface of the microsphere may be achieved using any chemical agent or technique that is known to result in the formation of a covalent bond between the reactive units of the polymer and the surface of the microsphere. One such method involves the use of a cerium (IV) compound as described in U.S. Pat. No. 5,527,618 and in *Macromolecules* 1999, 32, 565–573. Soluble polymers containing ethylenic unsaturation may also be used as macromonomers, which will result in relatively high efficiencies of grafting. Alternately, the polymerization reaction may simply be carried out in the presence of the soluble polymer. This method by itself will often result in free radical grafting or chemisorption of the soluble polymer to the surface of the microsphere, as described in WO 90/08786.

Furthermore, other less common techniques exist which are useful for preparing monodisperse polymer microspheres, which meet the size and monodispersity requirements of this application. Monomer mixtures may be emulsified by forcing the mixture through porous glass, as described in *J. Appl. Polym. Sci.* 1994, 51, 1–11, followed by initiation of polymerization to form polymer microspheres. Similarly, monodisperse monomer droplets can be formed by ejection through an acoustic bead, as described in *Journal of Controlled Release* 2001, 73, 59–74, and similarly polymerized. In addition both of these emulsification methods may be utilized with solutions of polymers and solid microparticles may be formed by a subsequent solvent evaporation step, as described in *Colloids and Surfaces, A: Physicochemical and Engineering Aspects* 1999, 153, 383–394. Soluble polymers may be grafted to microparticles formed by these methods using the techniques listed in previous sections.

The present invention also relates to a dispersion polymerization method of preparing polymer microspheres comprising combining at least one latent colorant, most preferably a coupler, at least one ethylenically unsaturated monomer, a stabilizing polymer, preferably a soluble stabilizing polymer, and an initiator in at least one solvent and initiating polymerization to form a polymeric microsphere stabilized by a soluble polymer bound to the surface or into the structure of the polymeric microsphere. The polymerization of the combined ingredients is a dispersion polymerization. The polymeric microsphere results from the polymerization of the ethylenically unsaturated monomer and may also contain latent colorant, most preferably coupler, distributed throughout the polymer microsphere. The soluble stabilizing polymer attaches to the surface of the microsphere as polymerization progresses to a point wherein the forming microsphere begins to become insoluble in the solvent. Preferably the latent colorant used is a photographic coupler containing ethylenic unsaturation.

The solvent utilized may be any suitable solvent or mixture of solvents that will disperse or dissolve the latent colorant, ethylenically unsaturated monomer, soluble stabilizer and initiator but in which the polymer microsphere is insoluble. The solvents useful in the present invention are liquids at or below room temperature. These solvents may include water, methanol, ethanol, n-propanol, isopropanol, acetone, 2-methoxyethanol, chloromethane, dichloromethane, ethyl acetate, n-propyl acetate, iso-propyl acetate, methyl ethyl ketone (MEK), toluene, xylene, cyclohexanone, 2-nitropropane, and methylene chloride, benzene, butyl acetate, chloroform, isopropyl ether, hexane, heptane, octane, petroleum ethers, cyclohexanol, butanol. A mixture of two or more of any of the above solvents may also be used.

Any of the common water-soluble or organic-soluble free radical polymerization initiators known in the art of addition polymerization may be used for this invention. These include, but are not restricted to azo compounds, such as 2,2'-azobis(4-methoxy-2,4-dimethylvaleronitrile), (1-phenylethyl)azodiphenylmethane, 2-2'-azoisobutyronitrile (AIBN), 1,1'-azobis(1-cyclohexanedicarbonitrile), 4,4'-azobis(4-cyanopentanoic acid), and 2,2'-azobis(2-amidinopropane) dihydrochloride, organic peroxides, organic hydroperoxides, peresters, and peracids such as benzoyl peroxide, lauryl peroxide, capryl peroxide, acetyl peroxide, t-butyl hydroperoxide, t-butyl perbenzoate, cumyl hydroperoxide, peracetic acid, 2,5-dimethyl-2,5-di(peroxybenzoate), and p-chlorobenzoyl peroxide, persulfate salts such as potassium, sodium and ammonium persulfate, disulfides, tetrazenes, and redox initiator systems such as $H_2O_2/Fe^{2+}$, persulfate/bisulfite, oxalic acid/$Mn^{3+}$, thiourea/$Fe^{3+}$, $H_2O_2$/ascorbic acid and benzoyl perozide/dimethylaniline.

The polymerization may be initiated by heating of the reaction mixture preferably in a temperature range from 35° C. to 85° C. or where the temperature is matched to the initiator used, that is, a temperature at which the initiator initiates polymerization. Alternately, one component of a two component redox initiator system may be added to initiate the polymerization. Such systems may often initiate polymerization at temperatures of room temperature and above. Alternately, photochemical initiation may be used.

The microspheres may be isolated and purified by a variety of methods. If a water-miscible solvent of solvent mixture is used, aqueous dialysis, diafiltration, or ultrafiltration may be used to replace the serum with water and remove any low molecular weight impurities. The water-immiscible organic solvent may be removed by rotary evaporation, azeotropic evaporation, low pressure distillation (LPD) or by boiling optionally under a stream of an inert gas such as nitrogen. Certain solvents, which form an azeotrope with water, such as toluene, can be easily removed by simple distillation. Alternately, the water-immiscible organic solvent may be removed by pouring the microsphere dispersion into a water-miscible organic solvent and the microspheres may be retrieved by filtration or sedimentation. A preferred method is repeated cycles of centrifugation, decantation of the supernatant, and redispersion into a desired solvent. The product microspheres, having excellent colloidal stability, may be stored as an aqueous dispersion or freeze dried to yield a solid powder which will easily redisperse in water.

The attachment of tags, preferably bioaffinity tags, to the surface of chemically functionalized microspheres may be performed according to the published procedures in the art, such as Bangs Laboratories, Inc, Technote #205 as follows.

When attaching bioaffinity tags to microspheres, there are a number of strategies that may be considered, including covalent coupling, adsorption and affinity binding. Bangs Laboratories, Inc, TechNote 201, "Working with Microspheres," provides a discussion of these different approaches.

Covalent coupling is often employed for the immobilization of biomolocules when a very active and stable microsphere reagent is required. For example, biomolecules are permanently bound, and will not desorb/leach over time, elimination of "crosstalk" between microspheres permits multiplexed tests and assays, ligands are favorably presented on the surface of the microsphere such that binding moieties are available for interaction with target molecules, or binding kinetics can approach those of solution based binding.

Although the general covalent coupling protocols will typically result in some level of bioaffinity tag attachment to the microsphere, it is expected that optimization will be required in order to achieve desired activity, performance, and stability. There are a number of factors and points of optimization to consider. As activity and binding kinetics are highly dependent upon orientation of the immobilized bioaffinity tag molecules, reactive groups that are available for coupling or modification on a bioaffinity tag molecule should be carefully considered. Biomolecules may be coupled to polymeric or silica microspheres through a variety of surface chemistries. Some commonly used surface functional groups include, but not limited to, carboxyl, amino, hydroxyl, hydrazide, amide, chloromethyl, epoxy, aldehyde, vinyl sulfone, succinimidyl ester, carbodiimide, maleimide, dithio, iodoacetyl, isocyanate, isothiocyanate, silica—silanol, and aziridine. There are a number of chemical compounds that may be employed to modify or bind to the available reactive group on the micosphere or the bioaffinity tag molecule. Crosslinking reagents may be used to activate groups that exhibit low reactivity in an aqueous environment, for example, carbodiimide for binding to COOH groups, or to join groups that are simply not reactive toward one another, for example, NH2 to NH 2. Some commonly used crosslinking reagents and the methods of their uses may be found in PIERCE Catalogue under technical section, page 155 to page 200, or in "Bioconjugate Techniques" by Greg T. Hernanson, Academic Press 1996. Certain types of linkers function as spacers, extending the bioaffinity tag molecule from the solid surface, often used in the coupling of small molecules or oligonucleotides to address steric affects. Linkers may also simplify conjugations or confer cleavability.

The specific composition of the microsphere will determine characteristics such as hydrophobicity/hydrophilicity, charge, whether positive or negative, and surface charge density. These characteristics will have some influence on the loading capacity, that is, how efficiently will the biomolecule come into proximity of the chemical group so that coupling may occur. They will also affect nonspecific binding characteristics, although nonspecific binding may be addressed with blocking agents, buffers, test/assay conditions, for example, sample dilution.

There are a number of buffers that have been used successfully in covalent coupling reactions. The protocols typically do not contain recommendations for specific buffers, as there is not a buffer that would be ideal for every scenario. Generally, the pH at which each reaction, such as activation, binding, quenching, blocking, occurs will be important. The compatibility of the buffer and ligand may be important, and should be considered when selecting buffers.

Additionally, the buffer should not contain compounds that will interfere or compete with the reaction or ligand. For example, phosphate and acetate buffers may reduce the reactivity of carbodiimides, and are not recommended for use as activation buffers when coupling to COOH-rnodified microspheres. A popular alternative in this instance is morpholinoethane sulfonate (MES). Also, buffers containing free amines, such as Tris or glycine, should be avoided when working with amine reactive chemistries.

A listing of common biological buffers with recipes is provided below. Ionic strength should be adjusted as appropriate, often 25 to 100 mM for coupling reactions. The list is not all encompassing.

1. Phosphate Buffered Saline (PBS). pH 7.4
   (a) potassium phosphate dibasic: 1.82 g/L (MW 174.2)
   (b) sodium phosphate monobasic: 0.22 g/L (MW 120.0)
   (c) sodium chloride: 8.76 g/L (MW 58.4)

Bring to final volume of 1 L using deionized (Dl) water. Adjust pH to 7.4 using either 1 N hydrochloric acid (HCl) or 1 N sodium hydroxide (NaOH).

2. Borate Buffer. pH 8.5
   (a) boric acid (H3BO3): 12.4 g/L (MW 61.8)
   (b) sodium tetraborate: 19.1 g/L (MW 381.4)

Add 50 mL of (a) to 14.5 mL of (b). Bring to final volume of 200 mL using DI water. Adjust final pH to 8.5 using 3 M NaOH.

3. Acetate Buffer. pH range 3.6 to 5.6
   (a) 0.1 M acetic acid (5.8 mL made to 1000 mL)
   (b) 0.1 M sodium acetate, anhydrous: 8.2 g/L (MW 82.0)

Mix acetic acid and sodium acetate solutions in the proportions indicated below and adjust the final volume to 100 mL with DI water. Adjust the final pH using 1 N HCl or 1 N NaOH.

| ml Acetic Acid | 46.3 | 41.0 | 30.5 | 20.0 | 14.8 | 10.5 | 4.8 |
| --- | --- | --- | --- | --- | --- | --- | --- |
| ml of Na Acetate | 3.7 | 9.0 | 19.5 | 30.0 | 35.2 | 39.5 | 45.2 |
| pH | 3.6 | 4.0 | 4.4 | 4.8 | 5.0 | 5.2 | 5.6 |

4. Citrate-Phosphate Buffer, pH range 2.6 to 7.0
   (a) 0.1 M citric acid: 19.2 g/L (MW 192.1)
   (b) 0.2 M dibasic sodium phosphate, dihydrate: 35.6 g/L (MW 178.0)

Mix citric acid and sodium phosphate solutions in the proportions indicated below and adjust the final volume to 100 mL with DI water. Adjust the final pH using 1 N HCl or 1 N NaOH.

| ml Citric Acid | 44.6 | 36.9 | 29.4 | 24.3 | 19.7 | 13.6 | 6.5 |
| --- | --- | --- | --- | --- | --- | --- | --- |
| ml of Na Phosphate | 5.4 | 14.1 | 20.6 | 25.7 | 30.3 | 36.4 | 43.6 |
| pH | 2.6 | 3.4 | 4.2 | 5.0 | 5.8 | 6.6 | 7.0 |

5. Carbonate-Bicarbonate Buffer. pH range 9.2 to 10.4
   (a) 0.1 M sodium carbonate (anhydrous): 10.6 g/L (MW 106.0)
   (b) 0.1 M sodium bicarbonate: 8.4 g/L (MW 84.0)

Mix sodium carbonate and sodium bicarbonate solutions in the proportions indicated below and adjust the final volume to 200 ml with DI water. Adjust the final pH using 1 N HCl or 1 N NaOH.

6. MES Buffer. pH range 5.2–7.2
   (a) Dissolve 19.2 g of MES free acid (MW 195.2) in approximately 900 mL of pure water
   (b) Titrate to desired pH with 1 N HCl or 1 N NaOH
   (c) Make up volume to 1000 mL with pure water.

Low concentrations (0.05–0.1%) of antimicrobial agents, such as sodium azide or merthiolate, are often added to the storage buffer, particularly for long-term storage. Antimicrobials should be carefully selected, as they may exhibit differing stability, and involve special disposal considerations.

Blocking agents are often coated on microspheres, via adsorption, following the coupling reaction. These compounds are used to minimize nonspecific interactions between the coated microsphere and non-target molecules in the sample, for example, hydrophobic interaction between proteins and polymer surface. The blocking agent should be selected carefully, to ensure that it is effective in minimizing nonspecific interactions, as certain blocking agents may interfere with the test/assay, or actually contribute to non-specific binding. Blocking agent concentration should be evaluated to ensure adequate blocking, especially in light of coating level of the capture molecule, without appreciable loss of activity. Blocking agents are often added to the storage buffer in varying amounts, standard concentrations being anywhere from 0.05% to 0.1% weight per volume (w/v). A separate in a higher concentration of blocking agent, typically up to 1%, is also recommended before storage, in order to saturate any exposed surfaces of the microspheres. BSA (bovine serum albumin) is often used alone but may be combined with other blocking agents, most commonly surfactant. Nonionic surfactants, such as Tween® 20 and Triton® X 100, are typical. When used in combination with another blocking agent, a common ratio is 1% blocking agent: 0.05% surfactant.

The following protocols are intended to provide general guidelines for the coupling of bioaffinity tags to microspheres bearing different surface groups. They are intended to exemplify the coupling chemistry with some most commonly used methods in the arts, but for those skillful in the arts, there are many alternative methods that may be used to accomplish the same purpose. The reagents for each protocol may be chosen for those skillful in the arts based on a particular application and individual's need. Although these generic protocols are likely to result in some level of microsphere modification, optimization may be required in order to achieve optimal activity and stability, while minimizing nonspecific binding characteristics.

A. Carboxyl-modified Microspheres
Procedure.
1. Wash 1 mL (100 mg/mL) of microspheres 2× in 10 mL activation buffer.
2. After second wash, resuspend pellet in 10 mL of activation buffer, ensuring that the microspheres are well suspended. Vortexing, sonication, or rolling should aid in resuspension.

The concentration of microsphere suspension is now 10 mg/mL.

3. While mixing, add 100.0 mg of 1-Ethyl 3-(3-Dimethyl Amino Propyl) Carbodiimide HCl, a water-soluble carbodiimide (WSC). The addition of WSC may cause clumping, which is generally not a cause for great concern and should be resolved by incubation with the biomolecule in steps 6–7.

4. Allow to react for 15 minutes at room temperature (18–25 C), with continuous mixing.

5. Wash 2× in coupling buffer and resuspend in 5 mL of same. As much as possible, ensure that the particles are well suspended, as in Step 2.

6. Dissolve protein (1–10× excess of calculated monolayer) in 6 mL coupling buffer. Combine microsphere suspension and protein solution.

7. React at room temp. for 2–4 hrs. with constant mixing.

8. Wash, resuspend in 10 mL of quenching solution, and mix gently for 30 minutes. Wash, and resuspend in storage buffer to desired storage concentration, often 10 mg/mL.

9. Store at 4 C until used.

One step coupling reactions, whereby the carbodiimide, protein, and microspheres are combined in one stop are often problematic for coupling larger molecules, but have been used effectively for the coupling of smaller molecules, like steroids and haptens. See Nathan C. F., Cohn Z. A., "Antitumor effects of hydrogen peroxide in vivo", J. Exp. Med. 1981, 154:1539–1563, U.S. Pat. No. 3,857,931, and Quash G., Roch. A M, Niveleau A., Grange J., Keolouangkhot T., Huppert J. "The preparation of latex particles with covalently bound polyamines, IgG and measles agglutinins and their use in visual agglutination tests" J. Immun. Meth. 1978, 22:165–74.

Water soluble sulfo-N-hydroxysuccinimide may be added to increase coupling efficiency. The active ester intermediate formed by the N-hydroxy compound will replace the o-acylisourea intermediate formed by the unstable WSC. This intermediate is more stable to hydrolysis and yet still highly reactive toward amines on the protein to be coupled.

B. Amino-modified Microspheres

Procedure:

1. Wash 1.0 mL (100 mg/mL) of microspheres 2× in 10.0 mL of wash/coupling buffer.

2. After second wash, resuspend pellet in 10.0 mL of glutaraldehyde solution made by dissolving glutaraldehyde in wash/coupling buffer to a final concentration of 10%, ensuring that the microspheres are completely suspended. Vortexing, sonication, or rolling should suffice.

The concentration of microsphere suspension is now 10 mg/mL.

3. Allow to react at room temperature for 1–2 hours, with continuous mixing.

4. Wash 2×, resuspend in 5 mL Wash/Coupling buffer, and ensure that the particles are completely resuspended, as in step 2.

5. Dissolve protein (1–10× excess of calculated monolayer) in 5 mL wash/coupling buffer. Combine microsphere suspension and protein solution. 6. React at room temperature (18–25° C.) for 24 hours with continuous mixing. 7. Wash, resuspend in 10 mL of quenching solution, and mix gently for 30 minutes. Wash, and resuspend in storage buffer to desired storage concentration, often 10 mg/mL. 8. Store at 4° C. until used.

Glutaraldehyde should be added in large excess so that amino groups on microspheres will be saturated, thus avoiding crosslinking between microspheres prior to ligand attachment. The amount added will require optimization, as too much glutaraldehyde may alter the native conformation of the protein, thereby reducing its biological activity.

Amino-reactive homobifunctional crosslinkers of varying lengths, other than glutaraldehyde, may be used to form spacer arms, allowing the covalently coupled proteins to be set off from the surface by varying lengths.

The bond formed between an anino group and an aldehyde forms a reversible Schiff base, which must be reduced by a process called reductive alkylation, in order for the bond to be covalent. Examples of commonly used reducing agents are sodium cyanoborohydride, amine boranes, and pyridine boranes. However, because several amino groups on each protein are interacting with the aldehyde groups on the microspheres, it is sometimes considered unnecessary to reduce these bonds when coupling most large proteins, like antibodies.

C. Hydroxyl-modified Microspheres

Procedure:

1. Wash 1.0 ml (100 mg/ml) of microspheres 2× in 10.0 mL of wash/coupling buffer. 2. After second wash, resuspend in 9.5 mL of activation buffer, ensuring that the microspheres, are completely suspended. Vortexing, sonication, or rolling should suffice. 3. In a frame hood, dissolve 1.0 g of CNBr or a ratio of 1 g CNBr100 mg microspheres in 0.5 mL acetonitrile.

4. Add CNBr solution dropwise to the stirring microsphere suspension, and allow the activation reaction to continue for precisely 2 minutes at room temperature (18–25° C.).

The concentration of microsphere suspension is now 10 mg/mL.

5. Quickly wash the activated microspheres in a large volume of ice-cold water, then with cold coupling buffer. Resuspend microspheres in 5 mL of coupling buffer (4° C.). Dissolve the ligand to be coupled in 5 mL of coupling buffer, at a concentration corresponding to a 1–10× excess of calculated monolayer. Combine microsphere suspension and protein solution.

6. Keep suspension at 4° C. for 24 hours, with constant mixing.

7. Wash, resuspend in 10.0 mL of quenching solution, and mix gently for 30 minutes. Wash, and resuspend in storage buffer to desired storage concentration, often 10 mg/mL.

8. Store at 4° C. until used.

D. Hydrazide-modified Microspheres

Procedure:

A. Oxidation of Protein

1. Dissolve or dilute 1–10× excess of calculated monolayer of protein in 1.0 mL of wash/coupling buffer.

2. Add the protein solution to an amber vial containing 1 mg sodium meta-periodate:20 mg of protein, swirl gently to dissolve the oxidizing agent.

3. Incubate the sample for 30 minutes at room temperature, with constant mixing.

4. Stop the reaction and remove unreacted NaIO4 by passing the mixture through a desalting column, such as like Sephadex(® G25 or PD10, equilibrated with the coupling buffer.

B. Coupling to Hydrazide-modified Latex Microspheres

1. Wash 1.0 mL(100 mg/mL) of microspheres 2× in 10.0 mL of wash/coupling buffer.

2. After second wash, resuspend microspheres in 9.0 mL of wash/coupling buffer, ensuring that the microspheres are completely suspended. Vortexing, sonication, or rolling should suffice.

3. Mix 9.0 mL suspension of microspheres with 1.0 mL of oxidized protein suspension and react with mixing for a minimum of 6 hours at room temperature (18–25° C.).

The concentration of microspheres is now 10 mg/mL.

4. Wash, resuspend in 10 mL wash/coupling buffer with 0.05–1% (w/v) blocking molecule, mix gently for 30 minutes.

5. Wash, resuspend in storage buffer to desired storage concentration, often 10 mg/mL.

6. Store at 4° C. until used.

E. Chloromethyl-modified Microspheres

Procedure:

1. Wash 1.0 mL (100 mg/mL) of microspheres 2× in 10.0 mL of wash/coupling buffer.

2. After second wash, resuspend microspheres in 5.0 mL of wash/coupling buffer, ensuring that the microspheres are completely suspended Vortexing, sonication, or rolling should suffice.

3. Dissolve protein ( 1–10× excess of calculated monolayer) in 5.0 mL wash/coupling buffer. Combine microsphere suspension and protein solution. The concentration of microsphere suspension is now 10 mg/mL.

4. React at room temperature for 2–4 hours with constant mixing.

5. Wash, resuspend in 10.0 mL of quenching solution, mix gently for 30 minutes at room temperature.

6. Wash, and resuspend in storage buffer to desired storage concentration, often 10 mg/mL.

7. Store at 4° C. until used.

In addition to some typical covalent coupling protocols discussed above, there are also miscellaneous coupling strategies to couple bioaffinity tags to non-functionalized polymeric microspheres.

It is possible to covalently couple biomolecules to plain polystyrene microspheres through a four-step process: nitration of surface styrene rings, conversion of nitro groups to aromatic amine groups, diazotization of aromatic amine groups to form diazonium compounds, and coupling to the ligand's COOH group, for example, protein tyrosine residue.

Polymethyl methacrylate (PMMA) microspheres are not widely used for covalent coupling of ligands, however, the methyl ester groups will react readily with hydrazine, yielding acyl hydrazide reactive sites. U.S. Pat. No. 5,194,300, incorporated herein by reference, describes the reaction of PMMA methyl ester groups particles with amine derivatized dyes by transacylation at elevated pH.11.

A number of linkers may be used to convert one surface functional group on a microsphere to another. For example, amine-modified microspheres may be converted to carboxyl-modified microspheres through a succinic anhydride. Conversely, carboxyl groups may be converted to amine groups through carbodiimide mediated attachment of a diamine. Sulfhydryl-modified microspheres may be developed by reacting amine-functionalized microspheres with iminothiolane. These and other conversion chemistries may be utilized to broaden the attachment strategies for various ligands.

EXAMPLES

Example 1

This example illustrates the synthesis method of preparing polymeric microspheres with couplers incorporated in the microspheres.

TABLE 1

Synthesis of Polymer Microspheres 1–6

| Microsphere # | Ethanol (mL) | 2-methoxy ethanol (mL) | Styrene (mL) | AIBN (g) | Coupler 13 (g) | Coupler 27 (g) | Coupler 41 (g) | PAA (g) |
|---|---|---|---|---|---|---|---|---|
| 1 | 87.5 | 125.0 | 36.6 | 0.38 | — | — | 0.85 | 3.75* |
| 2 | 87.5 | 125.0 | 36.6 | 0.38 | — | 0.85 | — | 3.75* |
| 3 | 87.5 | 125.0 | 36.6 | 0.38 | 0.85 | — | — | 3.75* |
| 4 | 87.5 | 125.0 | 36.6 | 0.38 | 0.425 | 0.425 | — | 3.75* |
| 5 | 43.8 | 62.5 | 18.3 | 0.19 | — | — | 0.425 | 1.88* |
| 6 | 53.12 | 53.12 | 17.9 | 0.19 | — | — | 0.85 | 1.88** |

PAA is polyacrylic acid: *Mw = 450K, **Mw = 90K, added as 7.52 g of 25% solution in water.

The coupler containing microspheres 1–6 were all prepared by an identical procedure. The coupler or couplers and the 2–2′-azoisobutyronitrile (AIBN) were dissolved in a solution of the styrene and 20 ml of the ethanol and bubble degassed with nitrogen for 20 minutes. The polyacrylic acid (PAA) was dissolved in the remaining solvents in a 3-neck round bottom flask (500 ml for 1–5, 250 ml for 5,6) outfitted with a stir bar, reflux condenser, and nitrogen inlet. The PAA solution was bubble degassed with nitrogen for 20 minutes, placed in a thermostatted water bath and brought to 65° C. at which point the coupler solution added. After about 15 minutes, the solutions showed a bluish translucence, then grew opaque white. The reactions were allowed to stir at 65° C. for 2 hours then for 16 hours at 75° C. The product dispersions were purified by three cycles of centrifugation, decantation of the clear supernatants, and redispersion in methanol. The final redispersion step used water instead of methanol. Median particle sizes ranged from 2.18–7.50 μm (see Table 2).

TABLE 2

| Microsphere # | Mean | Median | Mode | CV (%) | comments |
|---|---|---|---|---|---|
| 1 | 4.230 | 4.15 | 4.109 | 7.69 | |
| 2 | 4.622 | 4.28 | 4.680 | 5.84 | |
| 3 | 7.250 | 7.50 | 8.136 | 3.40 | small secondary mode at ~0.8 μm. |
| 4 | 3.948 | 4.02 | 3.794 | 13.75 | 5.22 |
| 5 | 5.553 | 5.57 | 6.035 | 22.24 | Large, sharp mode at ~6 μm, small secondary mode at ~0.8 μm. |
| 6 | 2.414 | 2.18 | 2.396 | 10.00 | |

Example 2

This example illustrates the attachment of pre-synthesized single strand oligonucleotide probe to the surface of coupler incorporated microspheres.

One hundred microliters of coupler incorporated microspheres from EXAMPLE 1 (4% w/v) was rinsed three times in acetate buffer (0.01 M, pH5.0), and combined with one hundred microliters of 20 mM 2-(4-Dimethylcarbomoyl-pyridino)-ethane-1-sulfonate and ten percent of polyethyleneimine. The mixture was agitated at room temperature for one hour and rinsed three times with sodium boric buffer (0.05 M, pH8.3). The microspheres were resuspended in sodium boric buffer.

An oligonucleotide DNA probe with 5'-amino-C6 modification was dissolved in one hundred microliters of sodium boric buffer to a final concentration of 40 nmol. A 20 microliters of cyanuric chloride in acetonitril was added to the DNA probe solution and the total volume was brought up to 250 microliter using sodium boric buffer. The solution was agitated at room temperature for one hour and then dialyzed against one liter of boric buffer at room temperature for three hours.

A 100 microliters of the dialyzed DNA solution was mixed with 200 microliters of microspheres suspension. The mixture was agitated at room temperature for one hour and rinsed three times with sodium phosphate buffer (0.01 M, pH7.0)).

Example 3

This example illustrates the attachment of an antibody bioactive probe to the surface of coupler incorporated microspheres.

One hundred microliters of coupler incorporated microspheres (4% w/v) was rinsed three times in acetate buffer (0.01 M, pH5.0), and combined with one milliliter of 50 mM 2-(4-Dimethylcarbomoyl-pyridino)-ethane-1-sulfonate. The mixture was agitated at room temperature for one hour and rinsed three times with sodium acetate buffer (0.01 M, pH5.0). A goat-anti-mouse IgG of 1 mg was added to the microspheres along with one milliliter of sodium acetate buffer (0.01 M, pH5.0). The mixture was agitated at room temperature for one hour and rinsed three times with 0.01 M phosphate saline buffer pH 7.0. Such antibody modified microspheres are ready for further uses.

Example 4

This example illustrates the hybridization and detection of target nucleic acid sequences to the gelatin coated microsphere on a glass support.

An oligonucleotide DNA with 5'-Cy3 labeling, which has complementary sequence to the DNA probe attached to the surface of the microspheres as shown in EXAMPLE3, was dissolved in a hybridization solution containing 0.9 M NaCI, 0.06 M NaH$_2$PO$_4$, 0.006 M EDTA, and 0.1% SDS, pH 7.6 (6×SSPE-SDS) to a final concentration of 1M. A microscope glass slide was first coated with a layer of gelatin by spreading 50 microliters of 2.5% gelatin solution on the surface of the glass slide. After the gelatin, a microsphere suspension of 1% prepared according to Example 3 containing 0.5% of bis(vinylsulfonyl) methane were applied onto the gelatin pre-coated glass slide and were allowed to dry to immobilize microspheres on 2-dimensional surface of the glass slide. The microsphere coated glass slide was hybridized in the hybridization solution starting at room temperature for 1 hour. Following hybridization, the slide was washed in 0.5×SSPE-SDS for 15 minutes three times.

The hybridization completed slide was imaged with an Olympus BH-2 fluorescence microscope from Diagnostic Instruments, Inc., with a SPOT camera, CCD resolution of 1315×1033 pixels, and fluorescence signals resulting from DNA hybridization on the surface of the microspheres were detected.

Example 5

This example illustrates the detection of protein target molecule to the gelatin coated microsphere on a glass support.

Mouse IgG of 0.001 mg/mL labeled with Cy3 or Cy5 was prepared in 0.05 M phosphate buffer, and combined with a suspension of 1% goat-anti-mouse modified microspheres as described in Example 3 to a total volume of one milliliter. The mixture was incubated at room temperature with gentle agitation for one hour. The microspheres were spun down after the incubation and rinsed three times in phosphate buffer pH7.0 0.1% tween 20. A microscope glass slide was first coated with a layer of gelatin by spreading 50 microliters of 2.5% gelatin solution on the surface of the glass slide. After the gelatin, a microsphere suspension of 1% containing 0.5% of bis(vinylsulfonyl) methane were applied onto the gelatin pre-coated glass slide and were allowed to dry to immobilize microspheres on 2-dimensional surface of the glass slide.

After drying, the glass slide was imaged with an Olympus BH-2 fluorescence microscope from Diagnostic Instruments, Inc. with a SPOT camera, CCD resolution of 1315×1033 pixels and fluorescence signals resulting from protein interactions on the surface of the microspheres were detected.

Example 6

This example illustrates the development of coupler incorporated microspheres into color on a gelatin coated glass support.

For each sample to be developed, 1 mL of microspheres was washed twice with pH 10. 10, 0.1 M sodium carbonate buffer and then the microspheres were resuspended to 0.6 mL in either the pure carbonate buffer or the carbonate buffer containing a small percentage of Benzyl alcohol (3.5%). Thereupon, 0.2 mL of a developer solution with 3.5 g/L para-phenylenediamine in degassed water was added, followed by 0.2 mL of an oxidizing solution of 20 g/L of $K_2S_2O_8$ in water. The microsphere mixture was allowed to react for 30 minutes at room temperature with agitation. The microsphere solution was then spun down for 1.5 minutes and rinsed twice with water.

A microscope glass slide was first coated with a layer of gelatin by spreading 50 microliters of 2.5% gelatin solution on the surface of the glass slide. After the gelatin, a microsphere suspension of 1% containing 0.5% of bis (vinylsulfonyl) methane were applied onto the gelatin precoated glass slide and were allowed to dry to immobilize microspheres on 2-dimensional surface of the glass slide.

After drying, the glass slide was imaged with an Olympus BH-2 microscope from Diagnostic Instruments, Inc. with a SPOT camera, CCD resolution of 1315×1033 pixels and color signals resulting from the development of couplers inside the microspheres were detected.

The invention has been described in detail with particular reference to certain preferred embodiments thereof, but it will be understood that variations and modifications can be effected within the spirit and scope of the invention.

What is claimed is:

1. A method of preparing polymer microspheres comprising combining at least one latent colorant, at least one ethylenically unsaturated monomer, a stabilizing polymer, and an initiator in at least one solvent and initiating polymerization to form a polymeric microsphere stabilized by a stabilizing polymer bound to the external surface of said polymeric microsphere.

2. The method of claim 1 wherein said polymer comprises an addition polymer made from at least one monomer comprising α,β-ethylenic unsaturation.

3. The method of claim 2 wherein said monomer comprises a monomer having limited solubility in water.

4. The method of claim 2 wherein said monomer comprises at least one member selected from the group consisting of styrenic, acrylic ester, methacrylic ester.

5. The method of claim 1 wherein said at least one monomer comprises at least two monomers.

6. The method of claim 1 wherein said polymer comprises a molecular weight of from 500 to 1,000,000 AMU.

7. The method of claim 1 wherein said latent colorant comprises a latent colorant covalently bound to said microsphere.

8. The method of claim 1 wherein said latent colorant comprises a latent colorant polymerized into said microsphere.

9. The method of claim 1 wherein said latent colorant comprises at least one coupler.

10. The method of claim 9 wherein said at least one coupler comprises formula (I):

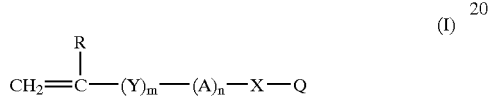

(I)

wherein:

R represents a hydrogen atom, a lower alkyl group containing from 1 to 4 carbon atoms, or a chlorine atom;

X represents —CONH—, —NHCONH—, —NHCOO—, —COO—, —SO$_2$—, —CO— or —O—; Y represents —CONH— or —COO—;

A represents an unsubstituted or substituted alkylene group containing from 1 to 10 carbon or an unsubstituted or substituted phenylene group;

Q represents a cyan color forming coupler residue, a magenta color forming coupler residue or a yellow color forming coupler residue capable of forming a dye upon coupling with an oxidation product of an aromatic primary amine developing agent;

m represents 0 to 1; and n represents 0 or 1.

11. The method of claim 10 wherein Q comprises a as a cyan color forming coupler phenol type residue represented by the general formula (II):

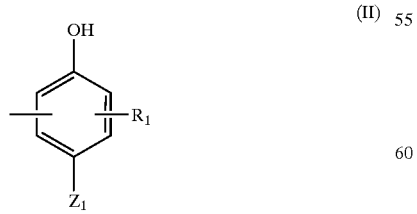

(II)

or a as a cyan color forming coupler naphthol type residue represented by the general formula (III):

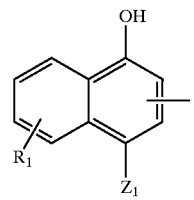

(III)

wherein:

R$_1$ independently comprises a hydrogen atom, an alkyl group, an alkenyl group, an alkoxy group, an alkoxycarbonyl group, a halogen atom, an alkoxycarbamoyl group, an aliphatic amido group, an alkylsulfamoyl group, an alkylsulfonamido group, an alkylureido group, a arylcarbamoyl group, an arylamido group, an arylsulfamoyl group, an arylsulfonamido group or an arylureido group; and Z$_1$ comprises a hydrogen atom, a halogen atom, or a substituted or unsubstituted sulfo group, acyloxy group, alkoxy group, aryloxy group, heterocyclic oxy group, alkylthio group, arylthio group or heterocyclic thio group.

12. The method of claim 10 wherein said Q comprises a magenta color forming coupler pyrazolone type residue and a magenta color forming coupler indazolone type residue.

13. The method of claim 10 wherein said Q comprises a magenta color forming coupler residue having formula (IV):

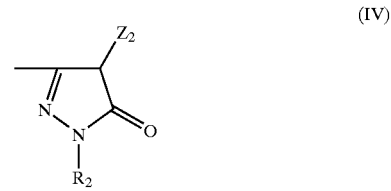

(IV)

wherein:

R$_2$ comprises a substituent at the 1-position of a 2-pyrazolin-5-one coupler, a substituted alkyl group, an aryl group or a substituted aryl group; and Z$_2$ comprises a hydrogen atom, a nitrogen atom, a sulfur atom, or a releasing group connected to the coupling position of the color forming coupler through an oxygen atom.

14. The method of claim 10 wherein said Q comprises a yellow color forming coupler acylacetanilide type residue, a yellow color forming coupler pivaloylacetanilide type residue represented by the general formula (V): or

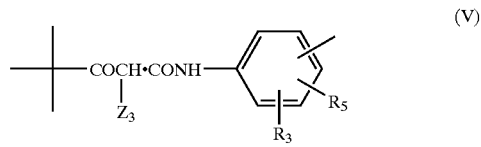

(V)

a yellow color forming coupler benzoylacetanilide type residue represented by the general formula (VI) or (VII):

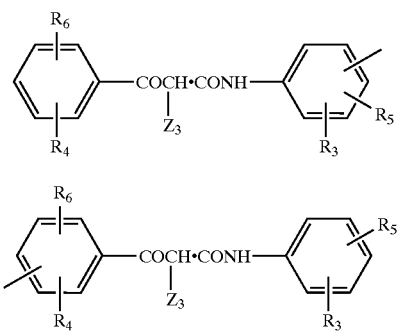

(VI)

(VII)

wherein:

R$_3$, R$_4$, R$_5$ and R$_6$ each independently represents a hydrogen atom, an alkyl group, an alkenyl group, an alkoxy group, an alkoxycarbonyl group, a halogen atom, an alkoxycarbamoyl group, an aliphatic amido group, an alkylsulfamoyl group, an alkylsulfonamido group, an alkylureido group, an alkyl substituted succinimido group, an aryloxy group, an aryloxycarbonyl group, an arylcarbamoyl group, an arylamido group, an arylsulfamoyl group, an arylsulfonamido group, an arylureido group, a carboxy group, a sulfo group, a nitro group, a cyano group or a thiocyano group;

Z$_3$ in the general formula comprises a hydrogen atom or a group represented by the general formula(VIII), (IX), (X) or (XI):

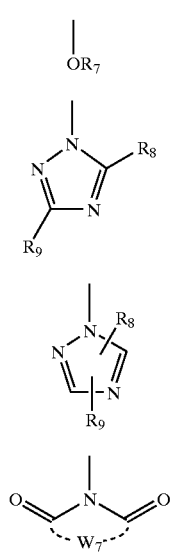

wherein:

R$_7$ represents an unsubstituted or substituted aryl group or an unsubstituted or substituted heterocyclic group;

R$_8$ and R$_9$ each independently represents a hydrogen atom, a halogen atom, a carboxylic acid ester group, an amino group, an alkyl group, an alkylthio group, an alkoxy group, an alkylsulfonyl group, a carboxylic acid group, a sulfonic acid group, an unsubstituted or substituted aryl group or an unsubstituted or substituted heterocyclic group; and W$_7$ represents non-metallic atoms necessary to form a 4-membered ring, a 5-membered ring or a 6-membered ring together with

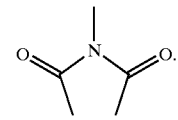

15. The method of claim 1 wherein said latent color couplers comprise photographic couplers.

16. The method of claim 1 wherein said latent colorant comprises at least one photochromic monomer having the following structure (XV):

$$P\text{-}(S)_n\text{-}R_{14} \tag{XV}$$

wherein:

n is an integer of 0 to 5;

P is a photochromic dye moiety or derivative thereof;

S is an organic spacer group; and

R$_{14}$ is a polymerizable group.

17. The method of claim 1 wherein said latent colorant comprises at least one thermochromic colorant.

18. The method of claim 1 wherein said latent colorant comprises at least one metal complex colorant.

19. The method of claim 1 wherein said latent colorant comprises at least one leuco dye.

20. The method of claim 19 wherein said leuco dye comprises polymerizable ethylenic unsaturation.

21. The method of claim 1 wherein said stabilizing polymer comprises a linear polymer.

22. The method of claim 1 wherein said stabilizing polymer comprises a soluble polymer.

23. The method of claim 1 wherein said microsphere comprises an external surface and said stabilizing polymer is bound to said external surface of said microsphere.

24. The method of claim 1 wherein said bound stabilizing polymer is covalently grafted, chemisorbed, or physically adsorbed to said external surface of said microsphere.

25. The method of claim 1 wherein said microsphere comprises an average diameter from 1–100 microns.

26. The method of claim 1 wherein said microsphere comprises an addition polymer microsphere.

27. The method of claim 1 wherein said microsphere is monodisperse.

28. The method of claim 27 wherein said monodisperse microsphere comprises a diameter having a coefficient of variation of less than 20%.

29. The method of claim 1 wherein further comprising a bioaffinity tag bound to the surface of said microsphere.

30. The method of claim 1 wherein said solvent comprises water, 2-methoxyethanol, methanol or ethanol.

31. The method of claim 1 wherein said polymer microsphere is insoluble in said solvent.

32. The method of claim 1 wherein said initiator is selected from the group consisting of azo compounds, organic peroxides, organic hydroperoxides, persulfate salts, and redox initiators.

33. The method of claim 1 wherein said initiator comprises an azo compound or an organoperoxide.

34. The method of claim 1 wherein said initiating polymerization comprises heating.

35. The method of claim 34 wherein said heating comprises a temperature from 35 C to 85 C.

36. The method of claim 34 wherein said heating comprises a temperature at which said initiator initiates polymerization.

37. The method of claim 1 further comprising purifying said polymer microspheres.

38. The method of claim 1 further comprising binding a tag to the external surface of said microsphere.

39. The method of claim 38 wherein said tag comprises a bioaffinity tag.

* * * * *